United States Patent [19]
Nakazawa et al.

[11] Patent Number: 4,626,290
[45] Date of Patent: Dec. 2, 1986

[54] INORGANIC FILLER AND PROCESS FOR PRODUCTION THEREOF

[75] Inventors: Tadahisa Nakazawa, Tokyo; Masahide Ogawa, Shibata; Kiyoshi Abe, Shibata; Kazuhiko Suzuki, Shibata, all of Japan

[73] Assignee: Mizusawa Industrial Chemicals, Ltd., Tokyo, Japan

[21] Appl. No.: 716,095

[22] Filed: Mar. 26, 1985

[30] Foreign Application Priority Data

Mar. 26, 1984 [JP] Japan .................. 59-56264

[51] Int. Cl.⁴ .................................. C04B 14/00
[52] U.S. Cl. .................. 106/288 B; 501/147
[58] Field of Search .......... 106/288 B; 501/147

[56] References Cited

U.S. PATENT DOCUMENTS 3,753,761  8/1973  Sugahara et al. ........... 106/288 B
3,993,500 11/1976  Isaac et al. ..................... 501/147
4,028,133  6/1977  Isaac et al. ................. 106/288 B
4,053,324 10/1977  Haden, Jr. et al. ......... 106/288 B
4,128,263 12/1978  Traxler ....................... 106/288 B Primary Examiner—Paul Lieberman
Assistant Examiner—Willie J. Thompson
Attorney, Agent, or Firm—Sherman and Shalloway

[57] ABSTRACT

An inorganic filler composed of a modified montmorillonite group clay mineral and having an X-ray diffraction pattern inherent to montmorillonite, an oil absorption of at least 100 ml/100 g and a Hunter whiteness of at least 80%. The modified clay mineral is produced by reacting a clay mineral of the montmorillonite group which 10 to 200% by weight based on the dry weight of the mineral, of an alkaline earth metal hydroxide in the presence of water, and reacting the reaction product with a salt of a metal of Group IIb, III or IV of the periodic table containing an acid radical which gives a soluble alkaline earth metal salt upon reaction. The inorganic filler is especially suitable for use in lightweight paper.

21 Claims, 3 Drawing Figures

INORGANIC FILLER AND PROCESS FOR PRODUCTION THEREOF

BACKGROUND OF THE INVENTION (1) Field of the Invention

This invention relates to an inorganic filler derived from a clay mineral of the montmorillonite group and having an excellent whiteness and a high oil absorption, and a process for production thereof. Particularly, the present invention relates to a filler for lightweight paper which well prevents strike-through of paper and has excellent opacity and acid resistance, and a process for production thereof.

(2) Description of the Prior Art

Decreasing of the weight of paper such as newsprint has been rapidly attempted to save wood resources, transportation costs, etc. Lighter weights, however, result in lower paper opacity, and particularly in "strike-through" which refers to a phenomenon in which ink after printing penetrates into the back surface of paper. For the purpose of preventing these inconveniences, it has been the widespread practice to incorporate fillers during papermaking.

Such fillers are required to have a high absorption of ink, namely a high oil absorption, acid resistance to sizing, and a high whiteness, and white carbon has been widely used as a filler meeting these requirements. White carbon (synthetic amorphous silica) is roughly divided into dry, aerogel and wet method forms depending upon the method of production. But white carbons by any of these methods are relatively high in cost, and it has been desired to develop inexpensive fillers which can replace white carbon.

The present inventors have now found that a compound obtained by reacting a clay mineral of the montmorillonite group with an alkaline earth metal hydroxide and then substituting a metallic component of Groups IIb, III or IV of the periodic table for the alkaline earth metal component has a high oil absorption and a high whiteness despite its X-ray diffraction pattern (layer-like crystal structure) inherent to montmorillonite, and is useful as a filler for various purposes, particularly for lightweight paper.

SUMMARY OF THE INVENTION

It is an object of this invention to provide a novel inorganic filler derived from a naturally occurring clay mineral of the montmorillonite group and having a high whiteness and a high oil absorption, and a process for production thereof.

Another object of this invention is to provide an inorganic filler having excellent chemical stability such as acid resistance and little tendency to abrade machines and instruments which come into contact with it, and a process for production thereof.

Still another object of this invention is to provide a filler for lightweight paper having an excellent combination of strike-through prevention, increased opacity and good acid resistance, and a process for production thereof.

According to this invention, there is provided an inorganic filler composed of a modified clay mineral obtained by reacting a clay mineral of the montmorillonite group with an alkaline earth metal hydroxide and thereafter substituting a metallic component of Group Ib, III or IV of the periodic table for the alkaline earth metal component, said modified clay mineral having an X-ray diffraction pattern inherent to montmorillonite, an oil absorption of at least 100 ml/100 g and a Hunter whiteness of at least 80%.

According to this invention, there is also provided a process for producing an inorganic filler, which comprises reacting a clay mineral of the montmorillonite group with 10 to 200% by weight based on the dry weight of the mineral, of an alkaline earth metal hydroxide in the presence of water, and thereafter reacting the reaction product with a salt of a metal of Group IIb, III or IV of the periodic table containing an acid radical which gives a soluble alkaline earth metal salt upon reaction.

BRIEF DESCRIPTION OF THE ACCOMPANYING DRAWINGS

DETAILED DESCRIPTION OF THE INVENTION

The present invention is based on the discovery that when a clay mineral of the montmorillonite group is reacted with an alkaline earth metal hydroxide and then the alkaline earth metal component is replaced by a metallic component of Group IIb, III or IV of the periodic table, the product has a marked improvement in oil absorption and whiteness.

The periodic table, as referred to in the present invention, means the periodic table described in the first page of "Theoretical and Applied Inorganic Chemistry" (Japanese-language publication) published by Maruzen Shuppan Co., Ltd. on Oct. 10, 1951.

Clay minerals of the montmorillonite group are generally based on a three layer structure comprising two tetragonal layers of $SiO_4$ sandwiching an octagonal layer of $AlO_6$ between them, and a plurality of such basic three-layer structures are laminated in the direction of C axis to form a multilayer crystal structure. Naturally occurring clay minerals of this group contain iron and magnesium components replacing part of the aforesaid alumina component, and in the part replaced by the magnesium component, potassium and sodium components are present to supplement bonds. Very rarely, these clay minerals exist solely in the form of aluminosilicate, and silicas such as α-cristobalite and quartz are present together.

Figure 1:
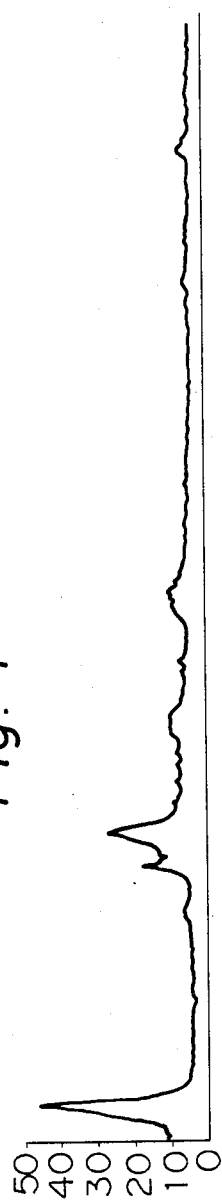
FIG. 1 is an X-ray diffraction pattern of a starting montmorillonite-group clay mineral.

The following table A show one example of the chemical composition of the montmorillonite-group clay mineral, and FIG. 1 shows one example of its X-ray diffraction pattern.

The mineral shown in this example has an X-ray diffraction pattern (cr) inherent to α-cristobalite in addition to an X-ray diffraction pattern (m) inherent to montmorillonite. As shown in Table B, this montmorillonite-group clay mineral itself has a relatively low level of oil absorption (JIS K-5101) of 30 to 70 ml/100 g, and having regard to the inclusion of the aforesaid iron component, etc., a Hunter whiteness of only about 60 to 79%.

TABLE A

| | |
|---|---|
| $SiO_2$ | 61.0–74.0% |
| $Al_2O_3$ | 12.0–23.0% |
| $Fe_2O_3$ | 2.0–3.5% |
| MgO | 3.0–7.0% |
| CaO | 1.0–4.0% |
| $K_2O$ | 0.3–2.0% |
| $Na_2O$ | 0.3–2.0% |
| ignition loss | 5.0–10.0% |

Figure 2:
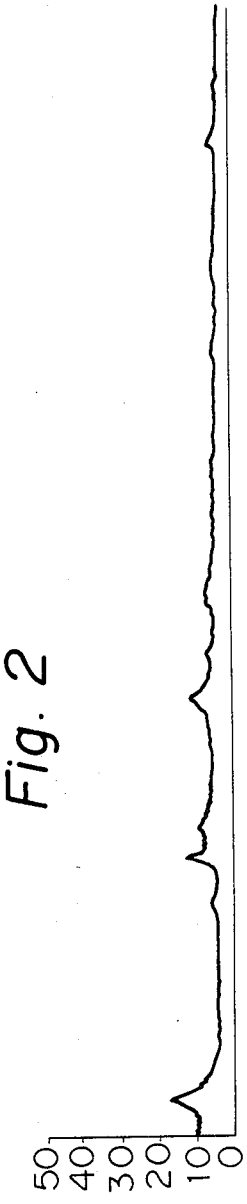
FIG. 2 is an X-ray diffraction pattern of the product of treatment of the clay mineral shown in FIG. 1 with calcium hydroxide.

When this clay mineral is reacted with an alkaline earth metal compound such as lime, it attains a markedly increased oil absorption of at least 100 ml/100 g and a markedly increased Hunter whiteness of at least 80% as shown in Table B while substantially maintaining its X-ray diffraction pattern inherent to montmorillonite as shown in FIG. 2.

The reason for this is not accurately known, but may be ascribed to the following. The alkaline earth metal hydroxide may not act on the basic three-layer structural units of montmorillonite, but the alkaline earth metal component intrudes between, and reacts with, the laminated layers of these units to convert the multilayer laminated structure into a smaller laminated structure and render the crystal particle diameter finer. This is presumably the cause of the increase of oil absorption. Furthermore, as shown in FIG. 2, the peak of α-cristobalite contained in the clay mineral has disappeared or become lower, and this indicates the conversion of a free silica component in the clay mineral into an alkali silicate. This is presumed to be another cause of the increased oil absorption.

The laminated units and crystal particles are rendered finer and the surface is hidden by the alkaline earth metal component. This is considered to contribute to a marked improvement in the whiteness of the inorganic powder.

The product of treatment of this clay mineral with an alkaline earth metal hydroxide may be satisfactory with regard to oil absorption and whiteness, but has alkaline pH of about 9.0 to 11.0 when suspended in water and lacks chemical stability. When it is used, for example, as a filler for lightweight paper, the alkaline earth metal component reacts with a sulfuric acid radical during sizing with aluminum sulfate to cause troubles such as a reduction in the oil absorption of the filler or the accumulation of the reaction product in the papermaking white liquor.

This may be prevented by neutralizing the clay mineral treated with the alkaline earth metal hydroxide, with an acid such as sulfuric acid or hydrochloric acid to fix the alkaline earth metal component as a relatively stable salt, or by removing the alkaline earth metal component in the form of a water-soluble salt, However, if this neutralization treatment is carried out, the oil absorption increased by the treatment with the alkaline earth metal hydroxide is again lowered to a markedly low level (see Table B).

According to this invention, the filler particles have been successfully stabilized chemically while maintaining a high oil absorption and a high whiteness by substituting a metal component of Group IIb, III or IV of the periodic table for the alkaline earth metal component in the reaction product of the clay mineral and the alkaline earth metal hydroxide.

Figure 3:
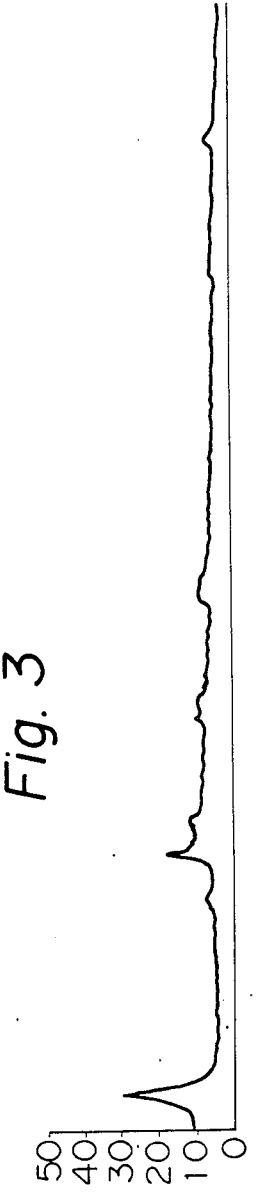
FIG. 3 is an X-ray diffraction pattern of the product of substitution treatment of the calcium hydroxide-treated product of FIG. 2 using aluminum chloride.

FIG. 3 shows an X-ray diffraction pattern of the modified mineral used in this invention, and it is seen that in the modified mineral, the X-ray diffraction pattern inherent to montmorillonite is substantially retained. The results given in Table B show that the high oil absorption of the mineral by treatment with the alkaline earth metal hydroxide is substantially retained, and its Hunter whiteness is increased by the substitution treatment. It can further be understood that by this substitution treatment, the alkaline earth metal component which becomes the cause of chemical instability is replaced by a stable component such as aluminum, and a dispersion of the modified mineral has a pH of 4.0 to 9.0 which is within a range desirable for a filler.

A product obtained by treating a montmorillonite-group clay mineral such as acid clay thoroughly with a mineral acid such as sulfuric acid has previously been known as a filler derived from the montmorillonite clay mineral. This product has been sold by the present applicant's company under the trade name Silton A, and actually been used for many years. This acid-treated product differs from the modified mineral of this invention in that the acid-treated product comprises $SiO_2$ composed of at least 90% of silica gel and hardly contains alumina, and its montmorillonite crystal structure is almost completely destroyed to render the mineral amorphous.

In the modified mineral used in this invention, the alkaline earth metal component is introduced during its preparation, but is finally replaced by the metal component of Group IIb, III or IV of the periodic table. Alumina and silica components among these replacing components are components contained in the original clay mineral. It is difficult therefore to determine the contents of these metal components in a general manner. However, the fact of these treatments being carried out can be ascertained by the fact that while having the X-ray diffraction pattern inherent to montmorillonite, the modified clay has an increased oil absorption of at least 100 ml/100 g, particularly at least 140 ml/100 g and an increased Hunter whiteness of at least 85%.

One example of the composition of the modified mineral is shown in Table C below.

TABLE B

| | Sample | | | |
|---|---|---|---|---|
| | 1<br>Starting<br>clay mineral | 2<br>Obtained by<br>treating<br>sample 1<br>with calcium<br>hydroxide | 3<br>Obtained by<br>neutralizing<br>sample<br>2 with HCl | 4<br>Obtained by<br>treating<br>sample 1<br>with aluminum<br>chloride |
| X-ray diffraction pattern | FIG. 1 | FIG. 2 | — | FIG. 3 |
| Oil absorption (ml/100 g) | 60 | 203 | 88 | 202 |
| Hunter whiteness (%) | 75.5 | 88.3 | 79.0 | 90.5 |
| pH of aqueous | 8.6 | 10.2 | 7.8 | 7.2 |

TABLE B-continued

|  | Sample | | |
|---|---|---|---|
| 1 Starting clay mineral | 2 Obtained by treating sample 1 with calcium hydroxide | 3 Obtained by neutralizing sample 2 with HCl | 4 Obtained by treating sample 1 with aluminum chloride | slurry

TABLE C

| | | |
|---|---|---|
| $SiO_2$ | 45–75 | % by weight |
| $Al_2O_3$ | 5–25 | |
| $Fe_2O_3$ | 0.5–3.0 | |
| $M^1O$ (*1) | 3.0–30 | |
| $M^2{}_2O_3$ (*2) | 0–20 | |
| $M^3O_2$ (*3) | 0–20 | |
| ignition loss | 4–15 | |

(*1): $M^1$ represents an alkaline earth metal or a metal of Group IIb.
(*2): $M^2$ represents a metal of Group III other than Al.
(*3): $M^3$ represents a metal of Group IV other than Si.

The modified mineral in accordance with this invention has some useful properties in addition to the aforesaid properties. Since the modified mineral is based on the layered structure of aluminosilicate of montmorillonite, it has surface smoothness and lubricity and lacks abrading tendency observed, for example, in silica gel such as an acid-treated clay mineral. Thus, when used as a filler of paper, the modified mineral of the invention scarcely has a tendency to abrade a papermaking screen, etc.

Furthermore, since this modified mineral has a fine layered structure or crystal particle diameter and contains a surface covering of the metal component of Group IIb, III or IV of the periodic table, it has a bulk density (JIS K-5101) of 0.15 to 0.40 g/cc, particularly 0.15 to 0.30 g/cc. It is a powder having a fine particle size and only a small degree of agglomeration. This modified mineral has a median particle diameter of 2.0 to 10.0 microns, particularly 4.0 to 8.0 microns, which is suitable as a paper filler. In addition, it has particularly good dispersibility in water and various media.

Furthermore, since this modified mineral is composed of an aluminosilicate having the aforesaid substitution component, it has a better hiding effect than synthetic amorphous silica, and has a great action of opacifying paper as well as preventing strike-through of ink.

One, or a combination of two or more, of acid clay, bentonite, subbentonite, fuller's earth, etc. may be used as the mineral clay of the montmorillonite group. These clay minerals can be used for the object of this invention even when containing a fairly large proportion of free silica such as cristobalite.

Calcium hydroxide is most suitable as the alkaline earth metal hydroxide in view of its reactivity and cost. Magnesium hydroxide, barium hydroxide and strontium hydroxide may also be used.

The amount of the alkaline earth metal hydroxide used is 10 to 200% by weight, especially 15 to 100% by weight, based on the dry weight of the clay mineral. If its amount is smaller than the above-specified lower limit, the improvement of properties such as oil absorption is unsatisfactory. If it is used in an amount larger than the specific upper limit, the excess does not participate in the reaction, and it is economically disadvantageous.

The reaction proceeds by mixing the clay mineral with the alkaline earth metal hydroxide in the presence of water and as required, heating the mixture. To secure the uniformity of the reaction, it is desirable to form an aqueous slurry of the clay mineral and mix it with the alkaline earth metal hydroxide. The extent of the progress of the reaction can be easily ascertained by measuring the pH of the slurry. For example, when the mineral is reacted with 20% calcium hydroxide, the initial pH of the slurry is 12.0 or more, but at the end of the reaction, the pH is on the order of 9.0 to 11.5

When it is desired to perform the reaction within a short period of time, it is preferably carried out under heat. Suitable temperatures are selected from 50° to 200° C. depending, for example, upon the difference in reactivity between the two materials. When high temperatures are employed, a hydrothermal reaction in an autoclave may also be used. The suitable reaction time is 30 to 600 minutes. The resulting reaction mixture is subjected to a solid-liquid separating operation such as filtration, and the separated product is subjected to the subsequent substitution treatment.

The metal component of Group IIb, III or IV of the periodic table may be a salt of such a metal with a monobasic acid, etc. The acid radical in the salt should be such that the salt resulting from reaction with the alkaline earth metal component is soluble. For example, a sulfuric acid radical can be used for a magnesium component. Suitable examples of the salt include zinc chloride, aluminum chloride, titanium tetrachloride, tin tetrachloride, aluminum nitrate, zinc nitrate and aluminum acetate. As other aluminum salts, $AlCl_3$ and polymeric aluminum salts such as polyaluminum chloride (PAC) may be used. A hydrochloric acid-acidified sol of silicic acid can also be used. Aluminum chloride is an especially preferred substitution component for the improvement of various properties.

The reaction product of the clay mineral with the alkaline earth metal hydroxide is reacted in the presence of water with the substitution treating agent described above, optionally under heat. As a result of the reaction, the alkaline earth metal component reacts with such an acid as a monobasic acid to become a soluble salt, and the aforesaid substitution component is bonded to the aluminosilicate of the clay mineral.

The degree of substitution is such that at least 30%, especially at least 50%, of the alkaline earth metal component is replaced. The substitution reaction proceeds advantageously at higher temperatures, and for example, temperatures from room temperature to about 100° C. are effective.

The product after the substitution reaction is filtered, washed with water, and as required, dried to form a final product.

The filler of this invention is especially advantageously used as a filler for lightweight paper. For example, by incorporating 0.1 to 5% of the filler into paper, effects of improving the opacity of paper or of preventing strike-through can be obtained.

The filler of the invention can be used in all of the fields where white carbon has previously been used. For example, it is useful as a paper coating agent.

EXAMPLE 1

(1) 1,500 g of acid clay occurring in odo, Shibata-shi, Niigata-ken, Japan and crushed to a size of about 10 mm was taken, and 2,700 g of water was added. The mixture was pulverized for 1 hour in a 7-liter ball mill.

Coarse particles (pebbles and sand) were removed by a 60-mesh sieve, and it was further pulverized for 2 hours to prepare an aqueous slurry.

The slurry had a water content, determined by a Kett water content meter (110°×30 min.), of 78.0%.

To the starting slurry was added 2,000 g of water to adjust its solids concentration to 8.0%. Then, a slurry of $Ca(OH)_2$ having a concentration of 7.6 g-CaO/100 ml was added in an amount of 1100 ml (the pH at this time was 13.20 at 20° C.), and with stirring, they were reacted at 90° to 95° C. for 2 hours in a water bath. At the end of the reaction, and pH of the slurry was 10.0 at 20° C. (Sample No. 1-1 slurry).

The treated slurry was suction-filtered, and the cake was dried for 15 hours in a constant temperature desiccator at 110° C. and then pulverized in a sample mill (sample No. 1-1). This product has an oil absorption, determined by JIS K-5101, of 203 ml/100 g, a bulk density, determined by JIS K-5101, of 0.255 ml/g, a whiteness, determined by a Hunter whiteness meter in accordance with JIS P-8123, of 88.3%, and a particle size distribution, determined by a micron photosizer SKN-100 (manufactured by Seishin Kigyo K.K.) shown in Table 1.

(2) 1,500 of sample No. 1-1 slurry prepared in (1) was taken into a 2-liter beaker, and with stirring, heated to 90° C. While maintaining this temperature, a solution of aluminum chloride (prepared form $Al(Cl)_3$ $6H_2O$, a reagent class 1 and water in a ratio of 1:1) was added in an amount of 62 ml over the course of about 30 minutes. After the addition, the mixture was stirred for 30 minutes.

The resulting slurry was suction-filtered, washed with water in an amount equal to the slurry, and dried and pulverized in the same way as described in (1) (sample No. 1-2). This product had an oil absorption of 20 ml/100 g, a bulk density of 0.233 g/ml, a Hunter whiteness of 90.5% and the particle size distribution shown in Table 1.

TABLE 1

| | Sample | | | | | | |
|---|---|---|---|---|---|---|---|
| | 0–2 | 2–4 | 4–6 | 6–8 | 8–10 | 10–12 | 12–14 |
| Sample No. 1-1 | 18.1 | 17.1 | 14.3 | 15.0 | 18.0 | 9.7 | 7.8 |
| Sample No. 1-2 | 16.0 | 15.3 | 14.8 | 14.1 | 16.8 | 13.2 | 9.8 |

EXAMPLE 2

Sample No. 1-1 slurry prepared in Example 1, (1) (362 g, solids 30 g) was heated to 50° C., and 33 ml of a silica sol acidified with hydrochloric acid (prepared by diluting commercial No. 3 sodium silicate to an $SiO_2$ concentration of 12% and adding 2 parts of the dilution of 1 part of 25% HCl) was added over the course of about 30 minutes. At this time, the slurry has a pH of as high as 8.20 at 50° C. It was lowered to 5.5 by adding 10 ml of 36.0% HCl. The slurry was thereafter filtered, washed with water, dried and pulverized in the same way as in Example 1. The product has an oil absorption of 162 ml/100 g, a bulk density of 0.308 g/ml and a Hunter whiteness of 90.1% (sample No. 2-1).

EXAMPLE 3

(1) 136.4 g (solids 30 g) of the acid clay slurry prepared in Example 1 was taken into a 1-liter beaker, and water was added to adjust the total amount of the slurry to 600 g. With stirring by a high stirrer, 31.3 g of magnesium hydroxide powder (made by Kamishima Chemcial Co., Ltd.; water content 4.0%) was added and dispersed fully. The slurry was then put into a small-sized autoclave having an inner capacity of about 1 liter (TEM-V-1000 manufactured by Taiatsu Garasu Kogyo K.K), and treated at 175° C. for 5 hours.

The product was filtered, dried and pulverized in the same way as in Example 1. The product had an oil absorption of 162 ml/100 g, a bulk density of 0.211 g/ml and a whiteness of 88.3% (sample No. 3-1).

(2) Three hundred grams of the slurry prepared in (1) above was taken into a 1-liter beaker, and water was added to adjust its total amount to 600 g. With stirring, the slurry was heated to 90° to 93° C. on an electric heater, and 23 ml of an aluminum chloride solution prepared from $Al(Cl)_3.6H_2O$, reagent class 1, and water in a ratio of 1:1 was added over the course of about 15 minutes.

The mixture was filtered, washed with water, dried and pulverized in the same way as in Example 1 to give a product having an oil absorption of 157 ml/100 g, a bulk density of 0.255 g/ml and a whiteness of 88.1% (sample No. 3-2).

EXAMPLE 4

(1) Acid clay occurring in Oaza Haguro, Nakajo-cho, Kitakambara-gun, Niigata-ken, Japan was wet-pulverized in the same way as in Example 1 to prepare a starting slurry. The slurry had a water content, determined by a Kett water content meter (110° C.×30 minutes), of 79.2%.

Water was added to 1000 g of the starting slurry to adjust its solids concentration to 8.0%, and 505 ml of a $Ca(OH)_2$ slurry was added. With stirring, the mixture was heated to 90° to 95° C. and treated for 2 hours at this temperature.

The treated slurry was filtered, dried and pulverized in the same way as in Example 1 to give a product having an oil absorption of 178 ml/100 g, a bulk density of 0.329 g/ml and a whiteness of 83.5%.

(2) Acid clay occurring in Matsune, Tsuruoka-shi, Yamagata-ken, Japan was wet-pulverized in the same way as in Example 1 to prepare a starting slurry having a water content, determined by a Kett water content meter (110° C.×30 min.) of 90.0%.

Water was added to 500 g of the resulting slurry to adjust its solids concentration to 8.0%. Then, 186 ml of lime milk having a concentration of 7.6 g-CaO/100 ml was added, and the mixture was worked up in the same way as in (1) above to give a product having an oil absorption of 247 ml/100 g, a bulk density of 0.178 g/ml and a whiteness of 81.6%.

EXAMPLE 5

A sheet of paper having a basis weight of 60 g/m² and made in a customary manner from a starting pulp composed of 80 parts of LBKP and 20 parts of NBKP using rosin-papermaker's alum was used as a base paper and coated under the following conditions.

As a sample, (1) the treated clay obtained in Example 1 or (2) activated clay (V$_2$ made by Mizusawa Chemical Industry, Co., Ltd.; oil absorption 85 ml/100 g) was used. Ten parts (calculated as anhydrous compound) of each of these samples and 10 parts of a 10% by weight solution of polyvinyl alcohol (PVA 117 made by Kuraray Co., Ltd.) were well dispersed in 30 parts of water. The dispersion was coated manually on the base paper by a coating rod whose number was selected so as to provide a coating rate of about 8.0 g (solids) per m$^2$, and then dried at 110° C. to form a coated paper.

Ink (0.004 ml) for a recorder made by Hitachi Limited was dropped onto the coated paper from a height of 1 cm by means of a microsyringe, and the time which elapsed until the ink dried and the size of the dot were measured. The results are shown in Table 2.

TABLE 2

| No. | Drying time (seconds) | Dot diameter (m/m) | Dot shape |
| --- | --- | --- | --- |
| 1 (Example) | 155 | about 6 | Nearly circular |
| 2 (Comparison) | 292 | about 9 | Nearly circular and the circumference was serrate |

EXAMPLE 6

Each of samples Nos. 1-2, 2-1 and 3-2 prepared in Examples 1, 2 and 3 was added to a pulp slurry composed of 80 parts of LBKP and 20 parts of NBKP, and the mixture was formed into a sheet by a hand mold method in a customary manner using rosin acid soap and papermaker's alum to include the sample filter into the paper. The effect of each of the samples to strike-through of paper was evaluated. The results are shown in Table 3.

TABLE 3

| Sample No. | Amount filled (%) | Basis weight (g/m$^2$) | Yield (%) | Strike-through value (%) | Opacity |
| --- | --- | --- | --- | --- | --- |
| 1-2 | 1 | 50.3 | 67.5 | 82.5 | 85.2 |
| 1-2 | 2 | 48.2 | 63.8 | 85.7 | 85.6 |
| 1-2 | 3 | 51.1 | 65.2 | 88.5 | 85.6 |
| 1-3 | 5 | 50.6 | 64.9 | 90.5 | 86.1 |
| 2-1 | 1 | 51.3 | 55.3 | 84.0 | 85.8 |
| 2-1 | 3 | 52.6 | 56.2 | 87.6 | 85.8 |
| 3-2 | 2 | 50.1 | 59.4 | 85.1 | 86.1 |
| 3-2 | 5 | 49.3 | 61.2 | 89.5 | 86.2 |
| Talc (comparative example) | 2 | 49.8 | 45.8 | 79.1 | 82.3 |
| Not added | — | 50.1 | — | 77.5 | 80.1 |

The above results demonstrate the very good strike-through preventing effect of the fillers of this invention as compared with talc (comparative example).

EXAMPLE 7

Samples Nos. 1-2, 2-1 and 3-2 were each subjected to an abrasion test on a bronze wire and a plastic wire by means of a filcon-type abrasion tester. As comparisons, kaolin, talc and acid clay were tested. The results are shown in Table 4.

The conditions for the abrasion test are shown in Table 5.

TABLE 4

| Sample | Amount of abrasion (mg) | |
| --- | --- | --- |
| | plastic wire | bronze wire |
| Example | | |
| 1-2 | 9 | 20 |
| 2-1 | 6 | 18 |
| 3-2 | 5 | 11 |
| Comparison | | |
| kaolin | 51 | 240 |
| talc | 28 | 82 |
| acid clay | 31 | 220 |

It is seen from Table 4 that the fillers obtained by this invention have a small amount of abrasion and the amount of the wire abraded during paper making can be drastically reduced.

ABRASION TEST CONDITIONS

Slurry concentration: 2%
Flow rate: 0.65 liter/min.
Material of the roll: ceramics
Roll diameter: 60 mm
Rotating speed of the roll: 1500 rpm
Contact angle: 99° for bronz, and 111° for palstic
Weight: 850 g
Type of wire: L60 for bronz, and OS-60 for plastic
Wire size: 40×140 mm
Testing time: 180 minutes
Value expressing the result: Weight decrease (mg)

What is claimed is:

1. An inorganic filler composed of a modified clay mineral obtained by reacting a clay mineral of the montmorillonite group with an alkaline earth metal hydroxide and thereafter substituting a metallic component of Group IIb, III or IV of the periodic table for the alkaline earth metal component, said modified clay mineral having an X-ray diffraction pattern inherent to montmorillonite, an oil absorption of at least 100 ml/100 g and a Hunter whiteness of at least 80%.

2. The inorganic filler of claim 1 wherein the clay mineral of the montmorillonite group consisting is at least one mineral selected from the group of acid clay, bentonite, subbentonite and fuller's earth.

3. The inorganic filler of claim 1 wherein the modified clay mineral has an oil absorption of at least 140 ml/100 g and a Hunter whiteness of at least 85%.

4. A process for producing an inorganic filler, which comprises reacting a clay mineral of the montmorillonite group with 10 to 200% by weight based on the dry weight of the mineral, of an alkaline earth metal hydroxide in the presence of water, and thereafter reacting the reaction product with a salt of a metal of Group IIb, III or IV of the periodic table containing an acid radical which gives a soluble alkaline earth metal salt upon reaction.

5. The process of claim 4 wherein the reaction of the clay mineral with the alkaline earth metal hydroxide is carried out at a temperature of 50° to 200° C. for a period of 30 to 600 minutes.

6. The process of claim 4 wherein the clay mineral of the montmorillonite group is at least one mineral selected from the group consisting of acid clay, bentonite, subbentonite and fuller's earth.

7. The process of claim 4 wherein the amount of the alkaline earth metal hydroxide is 15 to 150% by weight.

8. The process of claim 4 wherein the alkaline earth metal hydroxide is calcium hydroxide.

9. The process of claim 4 wherein the salt of a metal of Group IIb, III or IV is a monobasic acid salt of said metal.

10. The process of claim 9 wherein the monobasic acid salt is selected from the group consisting of zinc chloride, aluminum chloride, titanium tetrachloride, tin tetrachloride, aluminum nitrate, zinc nitrate, aluminum acetate, polyaluminum chloride, and a hydrochloric acid-acidified sol of silicic acid.

11. The process of claim 9 wherein the monobasic acid salt is aluminum chloride.

12. The process of claim 4 wherein at least 30% of the alkaline earth metal component is replaced by the metal component of Group IIb, III or IV in the final product.

13. The process of claim 4 wherein the reaction with the salt of a metal of Group IIb, III or IV is carried out at room temperature to about 100° C.

14. The inorganic filler of claim 1 wherein the alkaline earth metal hydroxide is calcium hydroxide.

15. The inorganic filler of claim 14 wherein the metallic component of Group IIB, III or IV of the periodic table is aluminum, zinc, titanium or tin.

16. The inorganic filler of claim 14 which when dispersed in water has a pH of 4.0 to 9.0.

17. The inorganic filler of claim 1 wherein the modified clay mineral has the following composition:

| Component | % by weight |
| --- | --- |
| $SiO_2$ | 45–75 |
| $Al_2O_3$ | 5–25 |
| $Fe_2O_3$ | 0.5–3.0 |
| $M^1O$ | 3.0–30 |
| $M^2O_3$ | 0–20 |
| $M^3O_2$ | 0–20 |
| ignition loss | 4–15 | where
$M^1$ represents an alkaline earth metal or a metal of Group IIb,
$M^2$ represents a metal of Group III other than Al; and
$M^3$ represent a metal of Group IV other than Si.

18. The inorganic filler of claim 1 which is further characterized by a bulk density of 0.15 to 0.40 g/cc and a median particle diameter of 2.0 to 10.0 microns.

19. The inorganic filler of claim 1 which is further characterized by a bulk density of 0.15 to 0.30 g/cc and a median particle diameter of 4.0 to 8.0 microns.

20. The inorganic filler of claim 1 wherein at least 50% of the alkaline earth metal component is replaced by the metallic component of Group IIb, III or IV.

21. A lightweight paper comprising paper pulp and from 0.1 to 5% by weight, based on the weight of the paper pulp, of the inorganic filler of claim 1.

* * * * *

UNITED STATES PATENT AND TRADEMARK OFFICE
CERTIFICATE OF CORRECTION

PATENT NO. : 4,626,290

DATED : December 2, 1986

INVENTOR(S) : TADAHISA NAKAZAWA, ET AL.

It is certified that error appears in the above-identified patent and that said Letters Patent is hereby corrected as shown below:

IN THE CLAIMS

Claim 2, line 2, (column 10, line 42), delete "consisting".

Claim 2, line 3, (column 10, line 43), after "group", insert --consisting--.

Signed and Sealed this

Tenth Day of March, 1987

Attest:

DONALD J. QUIGG

Attesting Officer

Commissioner of Patents and Trademarks